(12) United States Patent
Heise et al.

(10) Patent No.: US 9,090,289 B2
(45) Date of Patent: Jul. 28, 2015

(54) MOTOR VEHICLE BODY WITH STIFFENING STRUTS

(75) Inventors: Wilfried Heise, Rottenburg (DE); Asmir Salkic, Ulm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/992,306

(22) PCT Filed: Oct. 15, 2011

(86) PCT No.: PCT/EP2011/005184
§ 371 (c)(1),
(2), (4) Date: Aug. 30, 2013

(87) PCT Pub. No.: WO2012/076072
PCT Pub. Date: Jun. 14, 2012

(65) Prior Publication Data
US 2013/0334841 A1    Dec. 19, 2013

(30) Foreign Application Priority Data

Dec. 8, 2010   (DE) .......................... 10 2010 053 850

(51) Int. Cl.
*B62D 25/00*   (2006.01)
*B62D 25/20*   (2006.01)
*B62D 29/00*   (2006.01)

(52) U.S. Cl.
CPC ............... *B62D 25/00* (2013.01); *B62D 25/20* (2013.01); *B62D 29/001* (2013.01)

(58) Field of Classification Search
CPC . B62D 25/20; B62D 25/2009; B62D 25/2018

USPC ................... 296/203.01, 204, 187.01, 187.08
See application file for complete search history.

(56) References Cited

U.S. PATENT DOCUMENTS

| 4,693,140 | A  |   | 9/1987  | Stephan et al. |
| 4,774,117 | A  | * | 9/1988  | Oefner et al. ................... 428/71 |
| 5,816,755 | A  | * | 10/1998 | Thelin ........................... 409/132 |
| 5,934,847 | A  | * | 8/1999  | Thelin ........................... 409/132 |
| 6,206,458 | B1 | * | 3/2001  | Schroeder et al. ....... 296/203.01 |

(Continued)

FOREIGN PATENT DOCUMENTS

DE   10 2004 018 977 A1   11/2005
DE   10 2008 056 146 A1   5/2010

(Continued)

OTHER PUBLICATIONS

SubsTech—Substances & Technogolies (2 pages) Epoxy Matrix Composite reinforced by 50% carbon fibers http://www.substech.com/dokuwiki/doku.php?id=epoxy_matrix_composite_reinforced_by_50_carbon_fibers Jul. 23, 2014.*

(Continued)

*Primary Examiner* — H Gutman
(74) *Attorney, Agent, or Firm* — Crowell & Moring LLP (57) ABSTRACT

A motor vehicle body includes stiffening struts created from a composite fiber material. Each stiffening strut is connected at both ends to the adjoining body components via a connection section. The fibers of the stiffening strut run essentially unidirectionally in the direction of loading of the stiffening strut and the cross-sectional area of the stiffening strut remains constant at least between the connection sections of the stiffening strut along a length of the stiffening strut.

10 Claims, 6 Drawing Sheets

(56) References Cited

U.S. PATENT DOCUMENTS

| | | | |
|---|---|---|---|
| 6,296,301 B1* | 10/2001 | Schroeder et al. | 296/187.02 |
| 6,521,331 B1* | 2/2003 | Sikorski et al. | 428/292.1 |
| 6,586,110 B1* | 7/2003 | Obeshaw | 428/593 |
| 6,601,886 B1* | 8/2003 | Thayer | 293/133 |
| 6,821,638 B2* | 11/2004 | Obeshaw | 428/593 |
| 6,893,733 B2* | 5/2005 | Obeshaw | 428/593 |
| 6,949,282 B2* | 9/2005 | Obeshaw | 428/131 |
| 7,077,438 B2* | 7/2006 | Albers et al. | 293/102 |
| 7,906,191 B2* | 3/2011 | Pratt | 428/36.9 |
| 2002/0006523 A1* | 1/2002 | Obeshaw | 428/593 |
| 2002/0028332 A1* | 3/2002 | Pratt | 428/364 |
| 2002/0062546 A1* | 5/2002 | Obeshaw | 29/423 |
| 2002/0071920 A1* | 6/2002 | Obeshaw | 428/34.1 |
| 2004/0048022 A1* | 3/2004 | Pratt | 428/36.91 |
| 2005/0248113 A1 | 11/2005 | Kiel et al. | |
| 2006/0055207 A1 | 3/2006 | Reinhardt | |
| 2008/0231085 A1 | 9/2008 | Westing et al. | |
| 2010/0019540 A1 | 1/2010 | Fujimoto | |
| 2012/0068497 A1* | 3/2012 | Kia et al. | 296/187.03 |
| 2012/0098300 A1* | 4/2012 | Murray | 296/205 |
| 2013/0156979 A1* | 6/2013 | Stewart | 428/34.7 |
| 2013/0309435 A1* | 11/2013 | Boursier | 428/53 |
| 2013/0330124 A1* | 12/2013 | Haegele et al. | 403/345 |

FOREIGN PATENT DOCUMENTS

| | | |
|---|---|---|
| DE | 10 2009 053 979 A1 | 6/2010 |
| EP | 0 577 409 A1 | 1/1994 |
| EP | 1 600 362 A1 | 11/2005 |
| JP | 59-67040 A | 4/1984 |
| JP | 61-13006 A | 1/1986 |
| JP | 2004-359114 A | 12/2004 |
| JP | 2008-110690 A | 5/2008 |
| JP | 2009-190696 A | 8/2009 |
| WO | WO 2006/059724 A1 | 6/2006 |

OTHER PUBLICATIONS

SubsTech—Substances & Technologies (2 pages) Epoxy Matric Composite reinforced by 70% carbon fibers http://www.substech.com/dokuwiki/doku.php?id=epoxy_matrix_composite_reinforced_by_70_carbon_fibers Jul. 23, 2014.*

Coatings—protective coatings and barrier layers for the fibre reinforced plastics industry (1 page) http://netcomposites.com/guide/coatings/21 Jul. 23, 2014.*

German-language Written Opinion dated Jan. 11, 2012 (Six (6) pages).

International Search Report dated Jan. 11, 2012 (Eight (8) pages).

Japanese Office Action dated Sep. 30, 2014 with English translation (four pages).

Japanese-language Notification of Reason for Refusal dated Apr. 15, 2014, including English translation (8 pages).

* cited by examiner

MOTOR VEHICLE BODY WITH STIFFENING STRUTS

BACKGROUND AND SUMMARY OF THE INVENTION

The invention relates to a motor vehicle body with stiffening struts, in particular a body of a cabriolet vehicle.

Diagonal struts are used on the under body for the purpose of stiffening motor vehicle bodies, in particular on cabriolet vehicles. Generally four diagonal metallic struts in cruciform arrangement are fixed on the under body of the vehicle, in order to almost double the stiffness of the vehicle body. As is known, diagonal struts, which offer a maximum stiffness, are made of steel; however steel is disadvantageous in the sense of achieving a lightweight form of construction of the vehicle body and in terms of fuel economy.

German patent document DE 10 2009 053 979 A1 discloses a diagonal strut arrangement under the floor of the vehicle, which confers improved stiffness on the vehicle body. One end of each diagonal strut is fixed to the side skirting of the vehicle body and the other end is fixed in a hollow, which is arranged in the storage space area of the vehicle. This hollow, which for example is used as the spare wheel well, can be manufactured from a fiber-reinforced plastic for the purpose of weight reduction.

In order to extend the possibilities of a strut geometry and connection to the vehicle body, German patent document DE 10 2004 018 977 A1 describes a motor vehicle with a body, whose under body region is arranged with at least two stiffening struts, which respectively extend as a component from a body connection point to a vertical longitudinal median plane, at which point a connection frame is provided. This connection frame is freely arranged below the under body and at a distance from the latter; the struts being attached to this frame. Finally, German patent document DE 10 2008 056 146 A1 describes a molding or cladding for an under floor component of a motor vehicle, which is designed to increase the resistance and the stiffening combating the torsion loadings, both at a standstill and during the motion of the vehicle. This cladding is intended to be simple, favorably-priced and stable. To this end the cladding is formed from a fiber-reinforced plastic, in particular a sheet moulding compound.

Exemplary embodiments of the present invention are directed to the use of struts to provide a stiffened motor vehicle body, with a reduced weight while at the same time maximum stiffness is retained, so that the fuel consumption of the vehicle can be reduced.

In accordance with a first exemplary embodiment of the motor vehicle body according to the invention stiffening struts made of fiber-reinforced plastic (FRP) material are provided, in which each stiffening strut is fixed at both ends to the respective adjoining body component has, according to the invention, an essentially unidirectional orientation of the FRP fibers in the direction of loading of the FRP stiffening strut. In addition the cross sectional area of the stiffening strut remains essentially the same along the length of the strut; a deviation of the cross sectional area being possible at the sections of the points of fixing. Accordingly, the stiffening struts have a very high stiffness despite their light method of construction and are therefore suitable for use in the stiffening of cabriolet vehicle bodies, even though special high demands are made in respect of the stability of bodies in the cabriolet type of construction.

Thus, for a given motor vehicle body the cross sectional area of the FRP stiffening strut is selected such that the product of the cross sectional area times the effective modulus of elasticity of the FRP stiffening strut corresponds to a product given by a cross sectional area of a steel stiffening strut and its effective modulus of elasticity for the prescribed motor vehicle body, so that the FRP stiffening strut of the vehicle body according to the invention provides the same stiffness as that of a corresponding steel strut. In so doing the selected cross sectional area of the FRP stiffening strut has to be larger than would be required for the corresponding steel strut. The increase in cross sectional area of the FRP stiffening strut should be at least 20%, preferably at least 25%, and particularly preferred increase of 30% based on the cross section of the corresponding steel stiffening strut.

Thus, it is possible to stiffen the motor vehicle body with stiffening struts made from fiber-reinforced material at least to an extent achieved using steel struts, as in the prior art. Accordingly, the form of strut according to the invention provides an advantageous weight saving of up to 60% when a steel strut suitable for a vehicle body is replaced by a strut made from fiber-reinforced material.

The stiffening struts can be encased in a protective layer against mechanical damage, for example stone-pitting.

This protective layer could be, for example, a non-woven material or a wound fiber material, in particular a wound glass fiber material. An alternative protective layer can take the form of a non-abrasive, impact-resistant material, similar to a steel mesh or steel foil, however, it is also conceivable that a thermoplastic or elastomeric material could be used as a protective layer, which in particular could take the form of shrink tubing applied on the stiffening strut.

The wound fibers of a protective layer can be arranged to improve the stability and the protective effect with an angular offset with respect to the essentially unidirectional fibers of the stiffening strut.

Preferably, the stiffening strut is a pultruded fiber-reinforced/composite fiber material with a fiber content in the range between 50% and 75%, based on the overall volume of the fiber-reinforced material, preferably of 65%, and particularly preferred at a level of 70% with the attendant conferred stiffness.

The composite fiber material for the stiffening strut, with the unidirectionally-aligned reinforcing fibers, can take the form of carbon fibers in a duroplastic or thermoplastic matrix, however it is also conceivable that a mixed method of construction could be employed involving a hybrid composite fiber material with a light metal alloy matrix. In general it is also conceivable that the composite fiber material could contain a proportion of metal fibers or a metal mesh.

It is also possible that a material hybridization could be employed, for example with a metal core.

The joining concept of the stiffening struts according to the invention, before fastening to the motor vehicle body, provides that the connecting sections of the stiffening struts respectively have a joining location with respectively at least one access opening, in which a connection element, such as a screw, can be accepted.

The access opening can be machined out after the completion of the stiffening strut; however the access opening can also be provided as a cut-out in the manufacturing process. Further, the access opening can be provided by a step in the manufacturing process or by a subsequently inserted step.

Further, it is advantageous for the transmission of force in the FRP stiffening strut if the access opening is surrounded by a fiber reinforced area. Accordingly, the fibers can be arranged concentrically in rings, tangentially and/or radially around the access opening, similar to the shape of a spider's web or a target.

The complete connection section or at least the joint position can be equipped with a strengthened structure. This can be, for example, the inner lying metal core, the insert or a metal cladding of the joint position or of the connection section. This reinforcement structure can be incorporated in the stiffening strut during the manufacturing process, such that the reinforcement structure is manufactured integral with the stiffening strut. It can also be subsequently attached with adhesive, so that there is then an adhesive layer between the reinforcement structure and the stiffening strut. The adhesive layer combats corrosion of the metallic connection location on the vehicle body, in particular if the stiffening strut is made of CFRP.

A motor vehicle body being stiffened by means of the stiffening strut according to the invention can be, in particular, a cabriolet body.

These and other advantages are explained in the following description with reference to the accompanying figures. The reference to the figures in the description serves to support the description and the simplified understanding of the component parts. Components or parts of components, which are essentially the same or similar may be indicated using the same reference symbol. The figures are merely a schematic representation of an embodiment of the invention.

DETAILED DESCRIPTION

The invention relates to a FRP stiffening strut formed for attachment to the under body of a motor vehicle body, for example of a cabriolet, as a diagonal strut.

The diagonal strut is created from a composite fiber material, up to 60% of the weight of corresponding steel struts can be saved. While four steel struts required for the stiffening of an E-Class Cabriolet A 207 weigh around 12.5 kg, diagonal struts, created according to the invention from composite fiber material, weigh 7.5 kg less, for the same function.

The customary diagonal strut in steel, with a modulus of elasticity E of 210,000 N/mm$^2$ can be replaced by an FRP strut with a duroplastic matrix and a very high fiber content of approximately 70%, in that the lower modulus of elasticity of the CFRP strut of approx. 150,000 N/mm$^2$ is compensated by means of an approximately 30% larger cross-section area. Accordingly, the same stiffness and hence stiffness function as with the steel strut is achieved with the stated advantageous saving in weight. Furthermore, the struts according to the invention, made of CFRP, show significant improvements in the context of NVH (Noise Vibration Harshness), in particular in the sense that the excitations involved in front-end shake are better damped.

In addition to plastic struts strengthened with carbon fibers, other composite fiber material struts are also conceivable. It is also possible to use a mixed form of construction with a light metal alloy matrix, for example on the basis of aluminum or magnesium.

Figure 17:
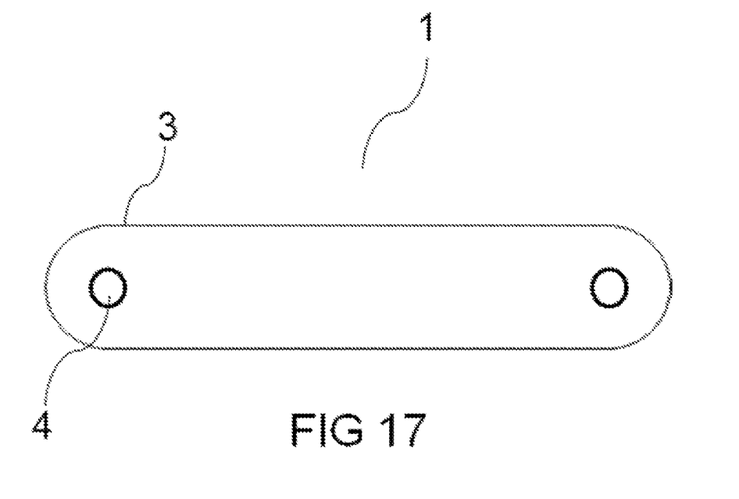

It is essential that the fibers of the diagonal strut run unidirectionally in the direction of loading and that the thus aligned strut has an almost constant cross-section area over its entire length. For example, FIG. 17 illustrates, in a highly schematic form, a stiffening strut 1 having a constant cross-sectional area between connection sections 3. The desired high stiffness in the direction of loading is achieved due to the unidirectional construction of the strengthening fibers.

The diagonal struts can therefore be easily, economically and continuously manufactured by means of the pultrusion method (also known as Pullwinding and Pullbriding). The manufacturing process is thus very economical and suitable for line production, can be automated and requires relatively small investment for plant and tools. Strut blanks can be cut to length from the straight pultruded endless profiles, and the connection regions for the connection of the struts to the under body of the motor vehicle can be processed, for example in that the screw attachment points are prepared. The pultrusion method also offers the advantage that a very high fiber content can be achieved and also material hybridizations, for example with a metal core or a metal mesh, are possible. In comparison with other (currently known) FRP processing techniques the pultrusion method enables the lowest light construction costs to be achieved. While with the pultrusion method two-dimensional forms of the strut are possible, the use of a pressing process instead enables three-dimensional contouring of the strut to be achieved.

FIGS. 1 to 15 show the connection section 3 of the diagonal strut 1, according to the invention, made from a fiber-reinforced material with unidirectional fibers.

Figure 1:
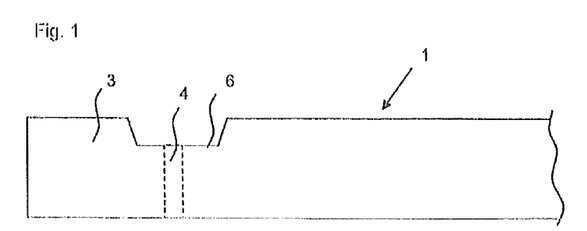
FIG. 1 A schematic side view of the connection section of a stiffening strut according to the invention, FIG. 2 A view corresponding to FIG. 1 of an alternative embodiment, FIG. 3 A view corresponding to FIG. 1 in another alternative embodiment, FIG. 4 A view corresponding to FIG. 1 in another alternative embodiment, FIG. 5 A view corresponding to FIG. 1 in another alternative embodiment, FIG. 6 A view corresponding to FIG. 1 in a further embodiment, FIG. 7 A view corresponding to FIG. 1 in a further embodiment, FIG. 8 A view corresponding to FIG. 1 in a further embodiment, FIG. 9 A view corresponding to FIG. 1 in a further embodiment, FIG. 10 A side view through the connection section of a stiffening strut according to the invention with a screw included in the representation, FIG. 11 A perspective section view through the position of the joint of the connection section corresponding to FIG. 10, FIG. 12 A side section view of a stiffening strut with a protective cover, FIG. 13 A plan view of the connection area with access opening, whereby the stiffening strut is surrounded by a protective layer, FIG. 14 A schematic cross-sectional representation through the connection area of a stiffening strut according to the invention, in which the access opening is obtained by creating a space in the wound fiber, FIG. 15 A plan view on the connection end of a stiffening strut according to the invention, with a fiber reinforced region around the access opening, FIG. 16 A side sectional representation showing a connection end of a stiffening strut according to the invention, with a metal shoe having the access opening, FIG. 17 A highly schematic cross-sectional view of a stiffening strut.

In FIG. 1 the joint position 6 with a tapered cross-section area can be seen in the connection section 3, in which the access hole 4 is also located. Here the diagonal strut 1 can be screwed directly to the vehicle body. The access hole 4 can be a milled hole and the body should be painted in the region of the connection in order to avoid contact corrosion.

Figure 2:
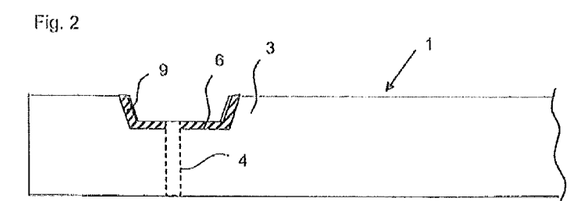
Figure 3:
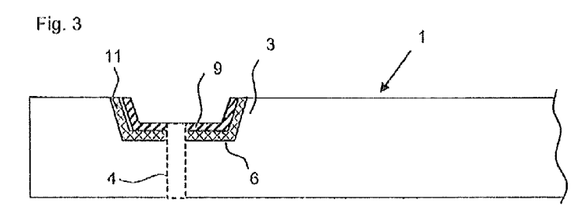

FIG. 2 shows a metallic lining 9 of the joint position 6, which is a "metal dish" 9. It can be installed directly, for example, even during manufacture. Such a metallic screw connection end can be coated with an anti-corrosion medium to avoid contact corrosion, or preferably painted. In FIG. 3 the metal dish 9 is secured by adhesive at the joint position 6 of the connection section 3.

Figure 4:
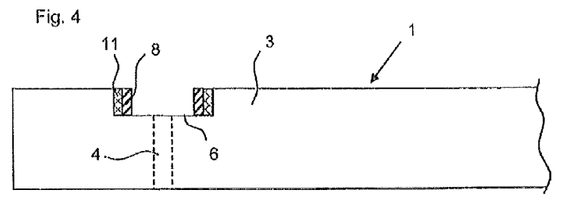

In FIG. 4 a sleeve or an insert 8 is attached in the joining position 6 as a lining of the access opening 4 by means of a layer of adhesive 11. Here, by "insert" is meant a sleeve or bush, with a thread if required. A sleeve in the sense intended in this instance must not take the form of a cylinder. The insert 8 can be inserted in the joint position 6 or in the access opening 4.

Figure 5:
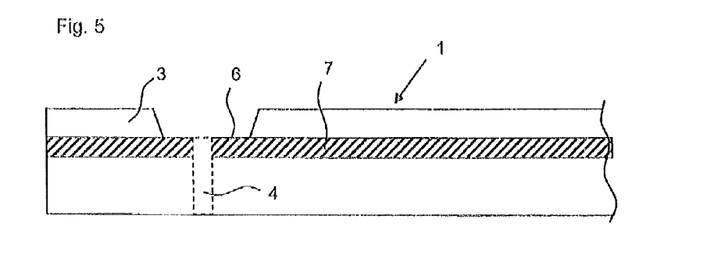
Figure 6:
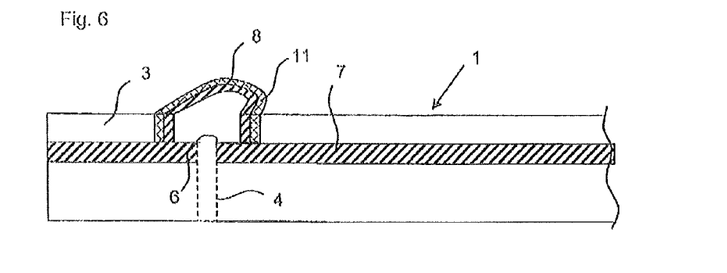
Figure 7:
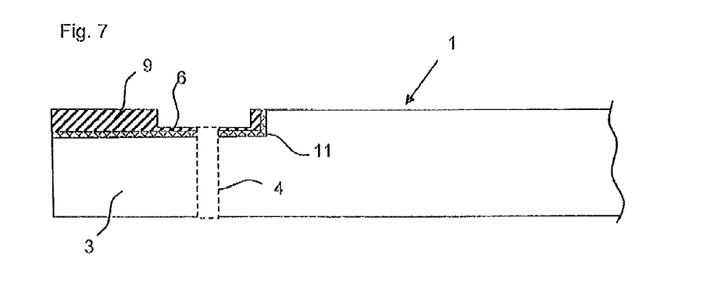
Figure 8:
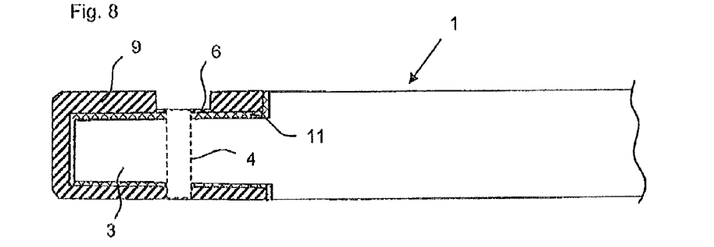
Figure 9:
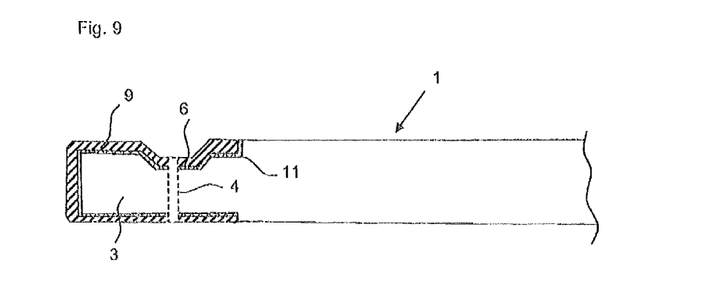

A metal core 7 is inserted in the diagonal strut 1 from FIG. 5 for further stabilization, in particular in the access opening area; this metal core is inserted such that it contacts the joint position 6. The access hole 4 runs through the metal core 7, as also in FIG. 6. The joint position 6 is strengthened there by an insert 8, which is secured with adhesive. In FIG. 7 the complete connection section 3 has a tapered cross-section area on one side; a metal clad part 9 is provided for this in such a way, that it increases the contour of the joint position 6. Also in FIG. 8 the connection section 3 of the diagonal strut 1 is tapered; here the connection section 3 is completely surrounded by a metal casing component 9, that is attached by means of an adhesive layer 11, thus here also, as in FIG. 7, the joint position 6 is provided in the metal casing component 9. FIG. 9 shows an alternative joint position 6 of a connection section 3 completely covered with a metal casing component 9.

Figure 10:
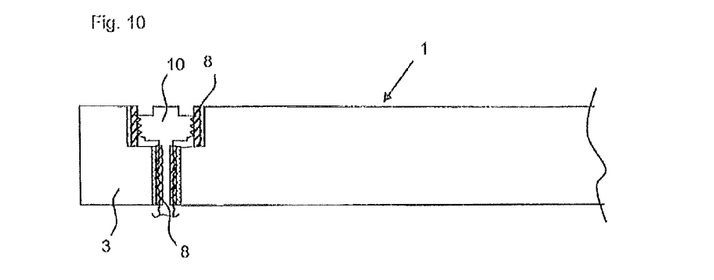
Figure 11:
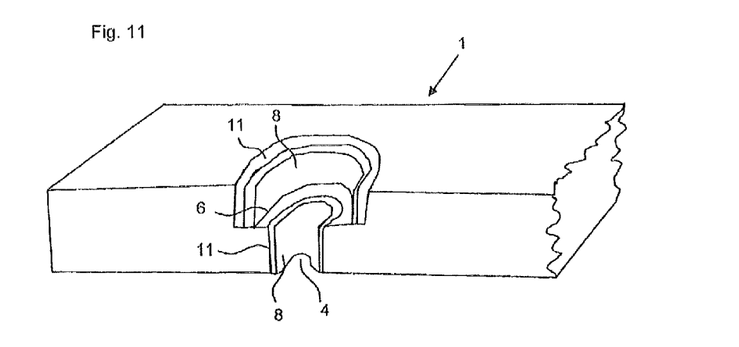

In the connection section 3 of the diagonal strut from FIG. 10 inserts 8 with internal threads are attached by adhesive in the joint position 6 and the access opening 4. However, these can alternatively also be pressed in or riveted in or integrated in the manufacturing process, in order to optimize the settling behavior of the screw connection by means of the screw 10.

FIG. 11 shows this version again in a three-dimensional sectional view, in which the metal sleeves 8, 9 with internal threads are inserted in the joint position 6 and the access opening 4.

Figure 12:
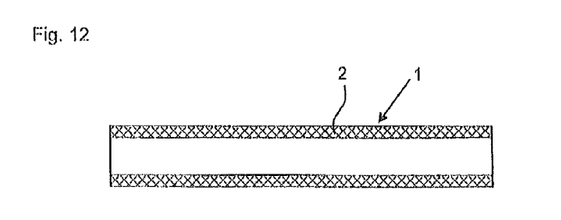
Figure 13:
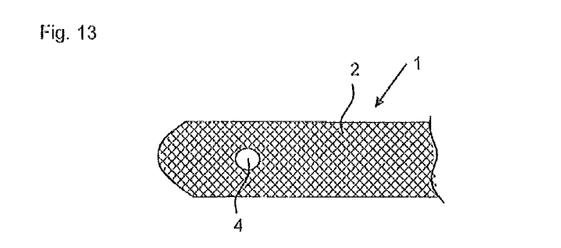

FIG. 12 shows the protective layer 2 for the protection of the inner lying diagonal strut profile 1 from stone chippings, misuse, corrosion and aggressive media. In the represented protective layer 2 this involves, as shown also in FIG. 13, a fiber winding, preferably comprising glass fibers, whose fibers are wound at an angle of 45° relative to the diagonal strut fibers.

Alternatively, the protective layer could also comprise a fleece or an elastic covering of rubber, an elastomer or a thermoplastic. The material should preferably take the form of a hose, which can be thermally shrunk onto the diagonal strut. Further, it is also conceivable that an abrasion and impact resistant material could be used, for example a steel mesh, a steel foil or a metallic hollow profile.

Figure 14:
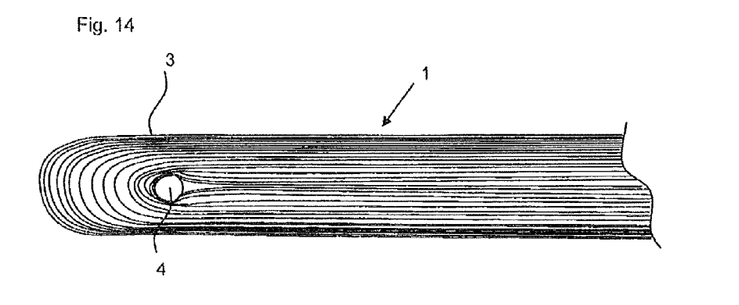
Figure 15:
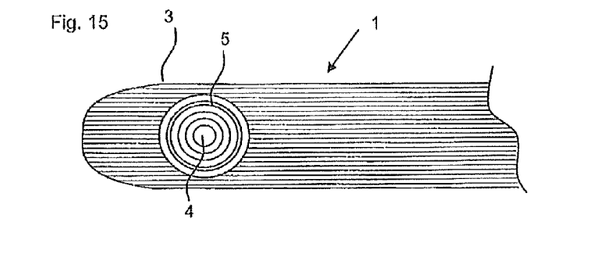

FIGS. 14 and 15 relate to the application of force and the transfer of force; they also show the connection end 3 of two diagonal struts 1. Here the unidirectionally arranged fibers can be seen, whereby in FIG. 14 the fibers are guided on the strut end 3 around the access opening 4, which thus leads to savings in the manufacturing process.

In FIG. 15 the access opening 4 is additionally equipped with a fiber-reinforced structure 5, which represents a correct force flow hole strengthening and is characterized by radial and ring-shaped fiber sections.

In this way the motor vehicle body according to the invention, which is light and nevertheless has maximum stiffness diagonal struts, also represents a very good solution for a motor vehicle body in the cabriolet range, which enables the best possible safety standard to be achieved and nevertheless takes account of the need for a light construction.

Figure 16:
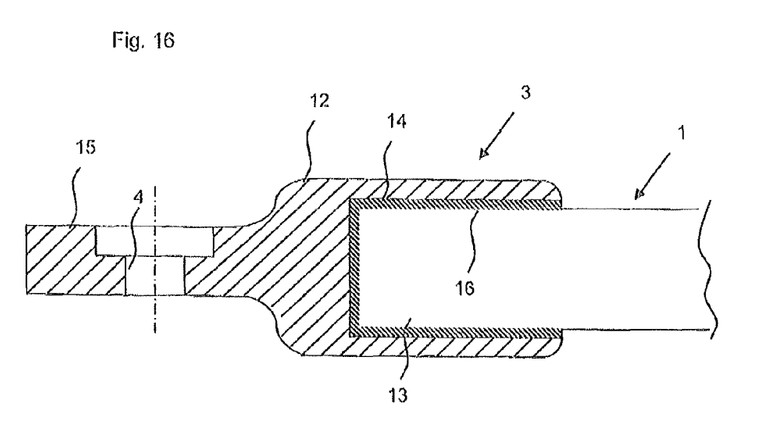

FIG. 16 is concerned with a special connection of the strut 1 to adjoining body components. In order to avoid weaknesses of the strut due to the provision of access openings 4, a metal shoe 12 is prepared, which has a recess 14, by means of which it is pushed onto an end 13 of the strut 1. It is also conceivable that the shoe 12 could be press-fitted or shrunk onto the strut 1, so that a high non-positive connection arises between the shoe 12 and the strut 1.

The shoe 12 has a protruding fixing flange 15, by means of which the strut 1 fixed to the shoe 12 can be fixed to the body components. All currently employed methods of fixing are possible, such as, for example, welding, soldering/brazing, clinching, adhesives and clipping. In the case of the latter an undercut has to be provided on the flange 15. In place of the flange 15 a rotationally symmetrical connecting piece can also be formed on the shoe 12, which carries an external thread so that the strut 1 together with the metal shoe 12 can be screwed into a body component. Further it is conceivable that measures could be taken to provide a bayonet connection on the connecting piece.

In the available flat flange 15, i.e. lying outside of the strut 1, an access hole 4 is provided on the respective connection section 3, which serves for the fixing of the strut 1 to the body components by means of a screw or a rivet. If required, this can take place via a bush, fixed in the access opening 4. The metal shoe 12 can be a forged, cast, milled or turned part; a hollow sleeve type profile is also conceivable, which is appropriately flattened in the area of the flange 15. The recess 14 is coated with an anti-corrosion medium, at least in the area of contact of the shoe 12 with the strut 1, for the avoidance of contact corrosion. Alternatively the end 13 of the strut 1 can also have a coating 16 of this type.

Alternatively or additionally to the stated means of fixing the strut 1 with the metal shoe 12, an adhesive can be used, whose adhesive layer additionally serves as a corrosion inhibitor and forms the coating 16. For the equidistant orientation of the strut 1 in the recess 14 of the metal shoe 12, small spheres can be arranged in the adhesive layer, the small spheres preferably being glass spheres all of the same diameter. In addition it is conceivable, that one or more channels are formed in the metal shoe 12 in the region of the recess 14, which pass outwards from the latter. By this means superfluous adhesive can be removed in a targeted fashion. In this way it is also possible via these channels to first feed the adhesive to the two connection partners, namely the metal shoe 12 and the end of the strut 13. A particularly secure connection between the metal shoe 12 and the strut 1 can be created through this adhesion, which can accommodate high mechanical loadings without loosening.

Although the stiffening strut described here takes the form of a diagonal strut for reinforcement of the under body, an extension of the range of application to the whole of the vehicle body is possible. To this end the strut 1 can be used not only as an additional component for the stiffening of the vehicle body structure; conceivably the strut 1 can also function as a replacement for structural components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle body, comprising:
   stiffening struts constructed from a composite fiber material,
   wherein each stiffening strut is connected at a first and second end to adjoining vehicle body components via respective connection sections,
   wherein fibers of the stiffening strut are aligned unidirectionally in a direction of loading of the stiffening strut, and
   a cross-sectional area of the stiffening strut remains constant at least between the respective connection sections of the stiffening strut along a length of the stiffening strut,
   wherein the connection sections respectively include a joining position with at least one access opening configured to accept a screw connection element, and
   wherein
      the access opening is a milled access opening, omitted during a manufacturing process, or provided by an insert, or
      the respective connection section comprises a metal shoe with an access opening lying outside the strut, the metal shoe is configured to be pushed onto one end of the strut and is attached by adhesive to the one end with formation of an adhesive layer in an overall area of contact between the strut and the metal shoe,
   wherein the access opening is surrounded by a fiber-reinforced region, wherein fibers of the fiber-reinforced region are formed in concentric rings, arranged tangentially or radially about the access opening.

2. The motor vehicle body according to claim 1, wherein the stiffening strut is at least partly encased in a protective layer.

3. The motor vehicle body according to claim 2, wherein the protective layer is formed by
   a non-woven material or a wound glass fiber, wherein fibers of the wound fiber are wound with an angular offset with respect to the fibers of the unidirectional fiber arrangement of the stiffening strut,
   a non-abrasive, impact-resistant steel mesh, steel foil, or a metallic hollow profile, or
   a thermoplastic or elastomer material that can be thermally shrunk onto the stiffening strut in the form of tubing.

4. The motor vehicle body according to claim 1, wherein the stiffening strut is a pultruded or pressed composite fiber material stiffening strut with a fiber content, based on a total volume of the composite fiber material, in the range of 50% to 75%.

5. The motor vehicle body according to claim 4, wherein the composite fiber material stiffening strut has a fiber content based on the total volume of the composite fiber material of 65%.

6. The motor vehicle body according to claim 4, wherein the composite fiber material stiffening strut has a fiber content based on the total volume of the composite fiber material of 70%.

7. The motor vehicle body according to claim 1, wherein the composite fiber material comprises:
   a carbon fiber composite material with a plastic matrix, or
   a hybrid-composite fiber material with a light metal alloy matrix of aluminum, a magnesium alloy matrix, or metal fibers.

8. The motor vehicle body according to claim 1, wherein the stiffening strut comprises an internal metal core along the length of the strut.

9. A motor vehicle body, comprising:
   stiffening struts constructed from a composite fiber material,
   wherein each stiffening strut is connected at a first and second end to adjoining vehicle body components via respective connection sections,
   wherein fibers of the stiffening strut are aligned unidirectionally in a direction of loading of the stiffening strut, and
   a cross-sectional area of the stiffening strut remains constant at least between the respective connection sections of the stiffening strut along a length of the stiffening strut,
   wherein the connection sections respectively include a joining position with at least one access opening configured to accept a screw connection element, and
   wherein
      the access opening is a milled access opening, omitted during a manufacturing process, or provided by an insert, or
      the respective connection section comprises a metal shoe with an access opening lying outside the strut, the metal shoe is configured to be pushed onto one end of the strut and is attached by adhesive to the one end with formation of an adhesive layer in an overall area of contact between the strut and the metal shoe,
   wherein at least the joining position of the connection section has a reinforcing structure formed by
      an inner lying metal core,
      the insert, or
      a metal cladding.

10. A motor vehicle body, comprising:
    stiffening struts constructed from a composite fiber material;
    wherein each stiffening strut is connected at a first and a second end to adjoining vehicle body components via respective connection sections;
    wherein the connection sections respectively include a joining position with at least one access opening configured to accept a screw connection element, wherein
       the access opening is a milled access opening, omitted during a manufacturing process, or provided by an insert, or
       the respective connection section comprises a metal shoe with an access opening lying outside the strut, the metal shoe is configured to be pushed onto one end of the strut and is attached by adhesive to the one end with formation of an adhesive layer in an overall area of contact between the strut and the metal shoe;
    wherein the access opening is surrounded by a fiber-reinforced region, wherein fibers of the fiber-reinforced region are formed in concentric rings, arranged tangentially or radially about the access opening; and
    a cross-sectional area of the stiffening strut remains constant at least between the respective connection sections of the stiffening strut along a length of the stiffening strut.

* * * * *